Dec. 4, 1962 K. PITTS ETAL 3,066,979
SWIVEL SEAT CONSTRUCTIONS
Filed Aug. 14, 1959 4 Sheets-Sheet 1
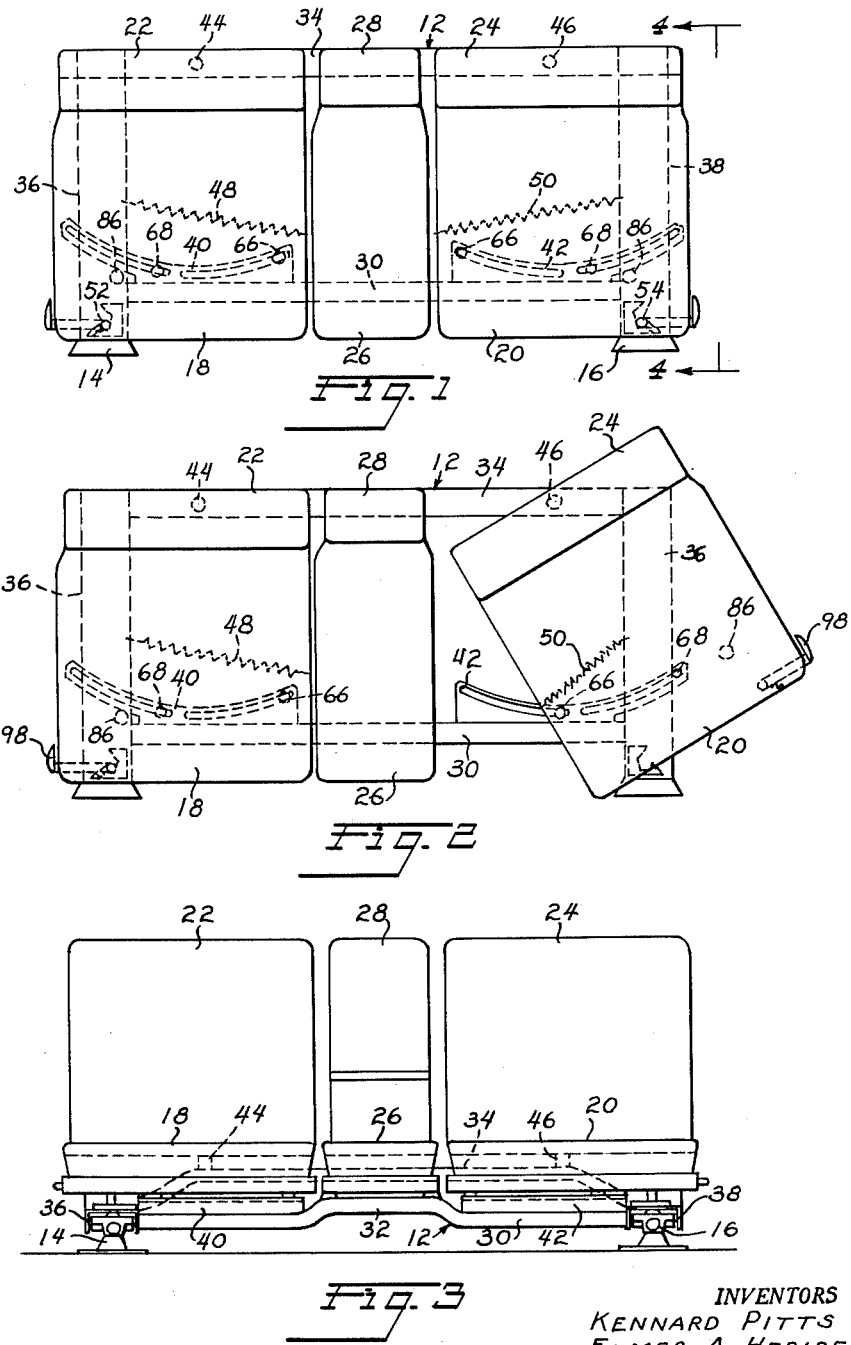
INVENTORS
KENNARD PITTS
BY ELMER A. HERIDER
Strauch, Nolan + Neale
ATTORNEYS

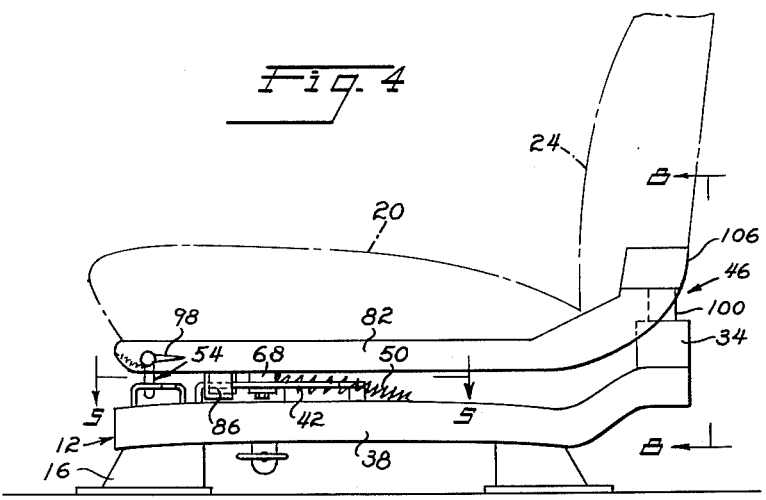
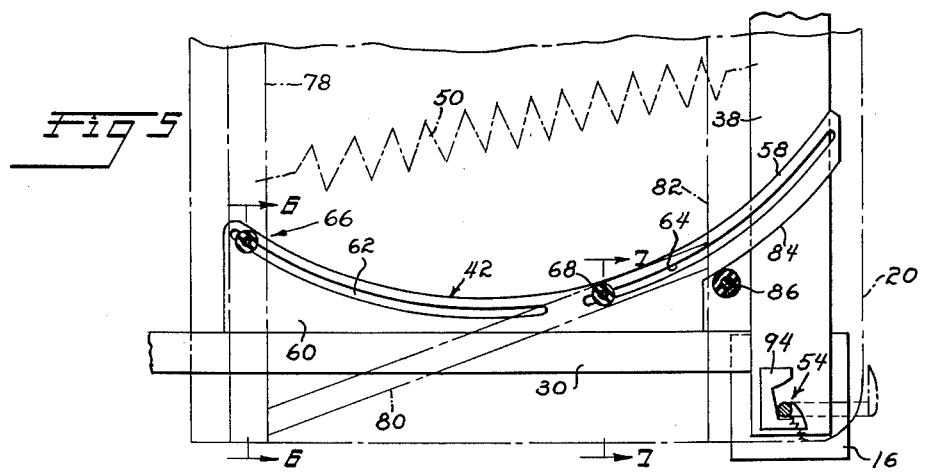
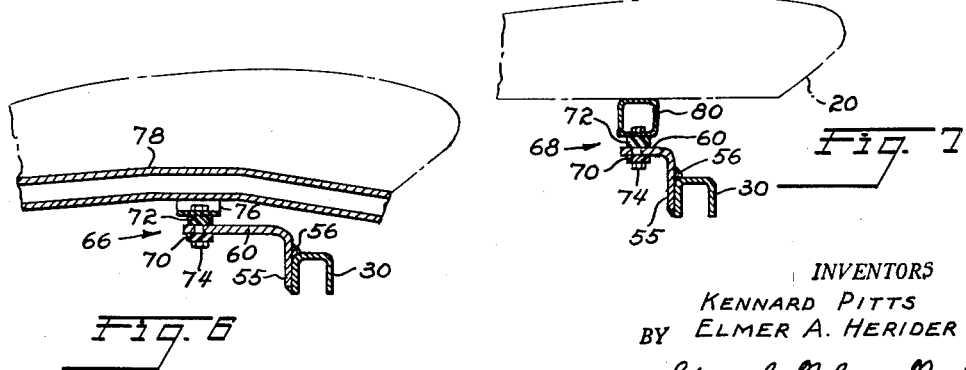
INVENTORS
KENNARD PITTS
BY ELMER A. HERIDER
Strauch, Nolan + Neale
ATTORNEYS

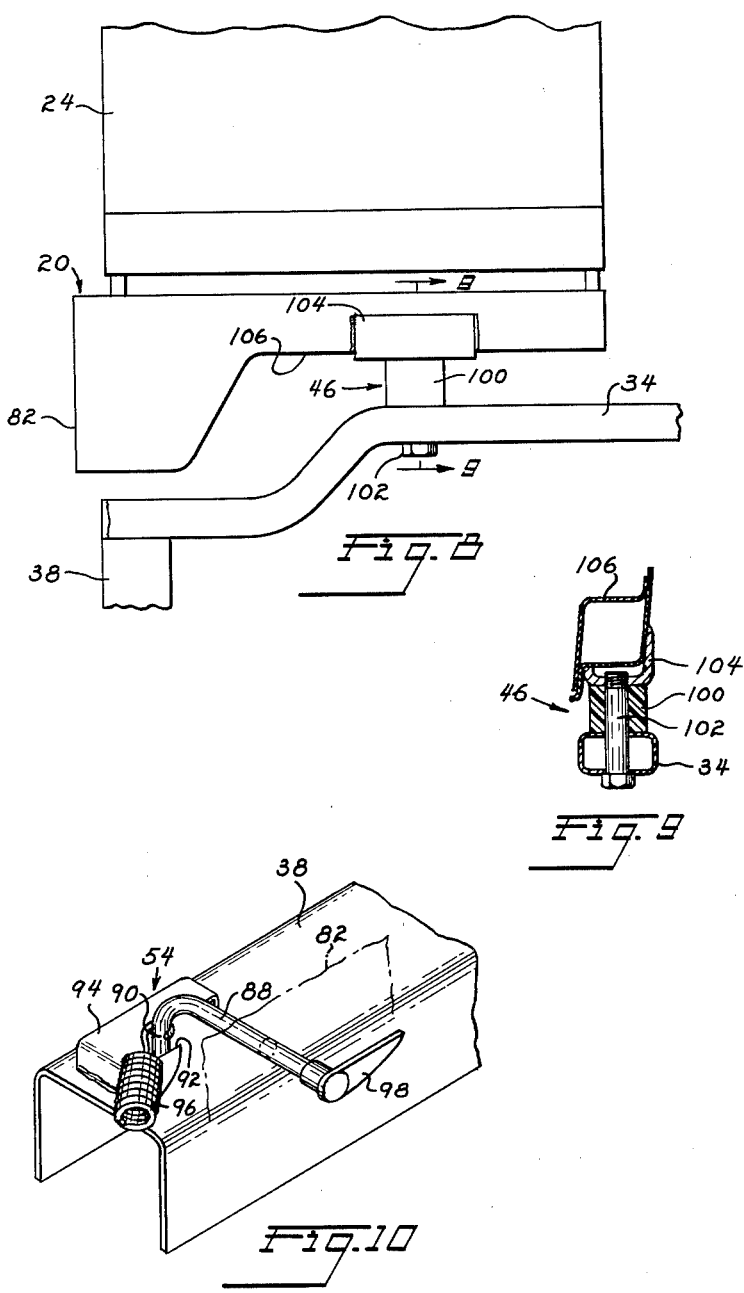

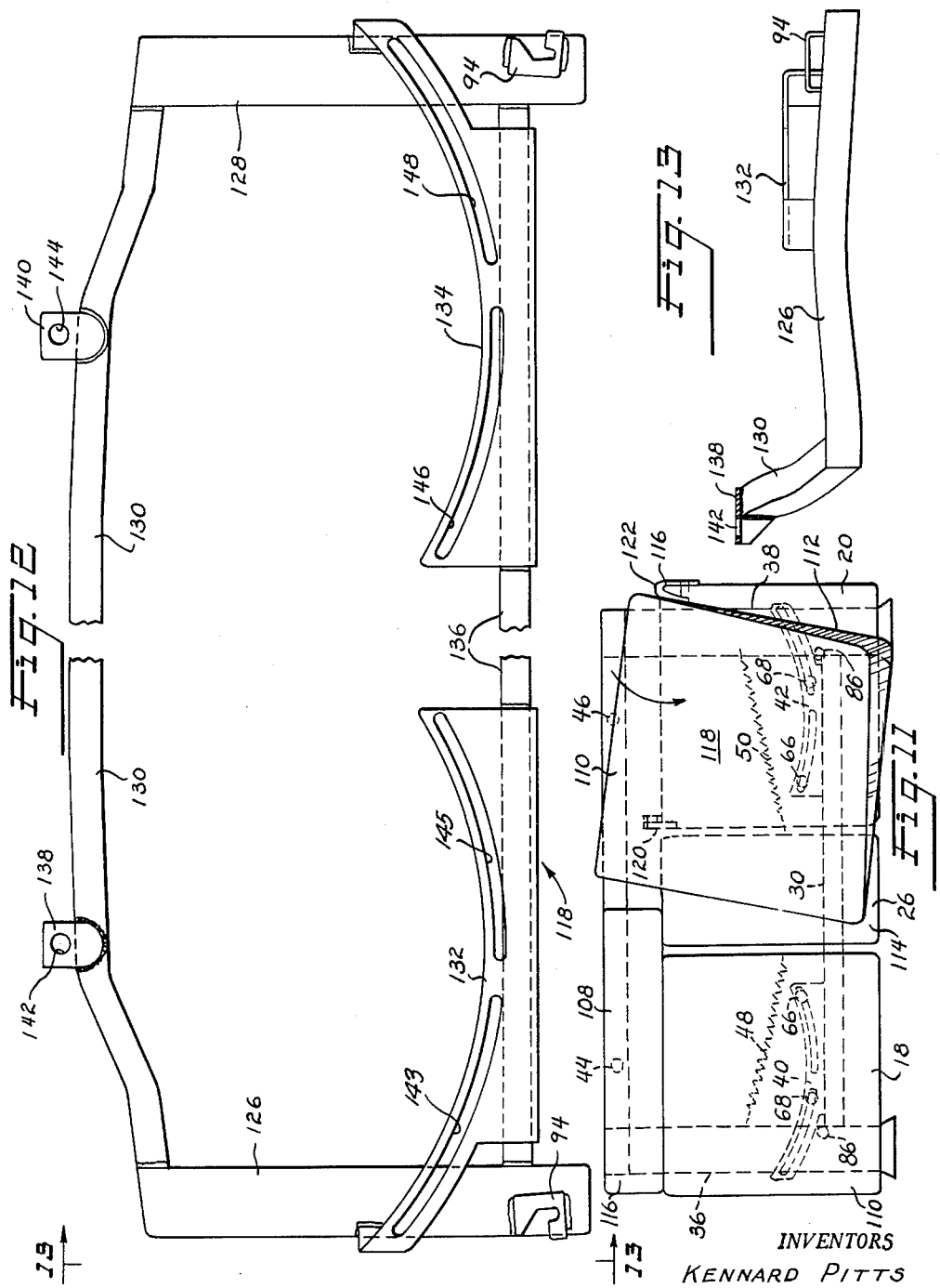

United States Patent Office 3,066,979
Patented Dec. 4, 1962

3,066,979
SWIVEL SEAT CONSTRUCTIONS
Kennard Pitts, Detroit, and Elmer A. Herider, Dearborn Township, Mich., assignors to Rockwell-Standard Corporation, Coraopolis, Pa., a corporation of Pennsylvania
Filed Aug. 14, 1959, Ser. No. 833,823
7 Claims. (Cl. 297—240)

The present invention relates to seat constructions for automotive vehicles and more especially to front seats of the divided type.

This type of seat is divided into outer seat members plus an intermediate seat member on a common unitary frame, one and preferably both of the outer seat members being mounted on a fixed pivot on the common frame for an outwardly swinging movement to facilitate the entrance or exit of a passenger through the adjacent automobile door. The placement of the fixed pivot is such that the axis thereof is adjacent the rear edge of each outer member and is preferably slightly offset toward the inside producing a swinging movement imparting a "side throw" to the passenger which literally lifts him into or out of the automobile. The outer seat members are spring-biassed toward the outer position and are normally locked in the forwardly facing position.

The divided seat construction as referred to herein may provide an intermediate seat member immovably secured to the common frame, but which may have a pivoted back rest convertible into a center arm rest. The outer seat members may also have pivoted back cushions to facilitate the entrance and exit into or out of the rear compartment in vehicles of the two-door type.

The present invention is concerned with improvements over the seat constructions described in copending application Serial No. 641,183 filed by Kennard Pitts et al. for "Vehicle Seat Construction," now issued as Letters Patent No. 2,958,369, dated November 1, 1960.

Among other features and important improvements the present invention provides a novel unitary base frame which supports all three seat sections and which is mounted on spaced apart longitudinal antifriction bearing slides for fore and aft movement of the entire front seat. This frame is in general of rectangular form and is composed of lightweight U-type channel sections welded together at their intersections. Spaced rearwardly extending arcuate raceways are rigid with the frame and have arcuate slots which provide the support and guidance for the outer swivel members. A spring-loaded catch lock in the outermost forward corners of the outer member seat frames coacts with corresponding locks on the front edges of the base frame to automatically lock the seats in their normal forward position to prevent accidental swivel action when the vehicle is in motion.

Another important object of the present invention resides in the provision of low friction bearings of plastic material at the pivot location and raceways for silent operation of the mechanism. The use of plastic bearings greatly reduces wear and consequently avoids costly replacements of parts, maintenance, and reduces the possibility that the mechanism will jar or jam.

A further object of the present invention is the provision of a unique combination of rolling and sliding support for the seats throughout the range of their swivel movement.

It is also an object of the invention to provide an improved seat underframe construction which is relatively inexpensive to manufacture, which has improved apppearance and which increases the useful space for the rear seat passengers.

Other important objects, novel features and improvements will become evident or will be pointed out in the following detailed description taken in connection with the appended drawings in which:

FIGURE 1 is a schematic top plan view of a front seat according to the present invention;

FIGURE 2 is the same as FIGURE 1 except that the left front outer seat member is swung outwardly;

FIGURE 3 is a front elevation of the seat of FIGURE 1;

FIGURE 4 is an enlarged side view of the seat of FIGURE 1;

FIGURE 5 is an enlarged plan view of one arcuate raceway and associated members substantially as seen along line 5—5 of FIGURE 4;

FIGURE 6 is a section through the raceway taken along line 6—6 of FIGURE 5;

FIGURE 7 is another section through the raceway taken along line 7—7 of FIGURE 5;

FIGURE 8 is an enlarged schematic rear view of the pivot construction;

FIGURE 9 is a section through the swivel seat pivot construction taken along line 9—9 of FIGURE 8;

FIGURE 10 is a fragmentary view showing the seat locking mechanism;

FIGURE 11 is a top plan view of a modified form of seat construction;

FIGURE 12 is a top plan view of a modified seat frame assembly; and

FIGURE 13 is an end elevation of the assembly of FIGURE 12.

With reference to FIGURES 1 to 3 the form of swivel seat structure there shown comprises a generally rectangular base frame 12 which is slidably supported on longitudinally extending antifriction bearing slides 14 and 16 for forward and rearward movement. Pivotally supported on the base frame member 12 are a left outer seat section 18 and right outer seat section 20. Outer seat sections 18 and 20 are provided with back rests 22 and 24, respectively, which may be pivoted to be folded forwardly to facilitate the entrance or exit into or out of the rear compartment of the automobile. Intermediate both outer seat members 18 and 20 and rigid with the base frame 12 is another smaller seat 26 to accommodate a third passenger. Seat 26 may be provided with a folding back rest 28 which, when folded down, constitutes an arm rest for the convenience of either passenger seated to the left or right thereof. Details of the seat sections are omitted to simplify the drawings.

The base frame 12 is composed of a hollow front rail 30 of rectangular cross section which is raised intermediate its ends at 32 (FIGURE 3) to clear the usual transmission hump (not shown). The front end of the middle seat section 26 is rigidly secured to this raised section 32 as shown in FIGURE 3. A similar rear rail 34, which rises a considerable distance above the plane of the front rail 30, is welded at its ends to similar inverted U-shaped side frame members 36 and 38 which are secured to and straddle the slide tracks 14 and 16. The front rail 30 is similarly welded to both side frame members 36, 38, near the front ends thereof to provide an integral unitary rectangular frame structure.

Welded to the front rail 30 adjacent both sides of the raised section 32 are similar arcuate raceways 40 and 42, the outer ends of which extend across the side frame members 36 and 38 and are welded thereto. Arcuate raceways 40 and 42 provide the support and swivel guide for the front portion of the outer seat sections 18 and 20. It is an important feature of the present invention that the tracks are raised to such an extent as to be substantially in the same plane as the raised mid-section 32 of the front rail 30 as best shown in FIGURE 3.

Pivots 44 and 46, respectively, are located at the rear edges of each of the outer seat sections 18 and 20 on the raised section of the rear rail 34 and constitute the geometrical center of the arcs provided by the raceways 40 and 42 and are preferably slightly offset laterally inwardly from the longitudinal centerline of each seat section toward the inside to impart a "throw" like swivel action to the outer seats in contrast to a limited central rotating movement. The swivel action of the present seat construction is such that the passenger is literally lifted into or out of the automobile with ease and enough freedom to clear the front pillar and hinge pillar of the doors. Coil retraction springs 48 and 50, respectively, assist in swinging the seat sections 18 and 20 outwardly when the respective catch locks 52 or 54 are released. The springs and locks are discussed in greater detail below.

Since the swivel and track mechanism of both outer seats are similar except for being left or right handed, it will suffice to describe only one thereof in detail, the left outer seat section 20 being chosen for this purpose.

With further reference to FIGURES 4 to 7, the arcuate swivel track 42 is substantially a flat angle iron structure the vertical side 55 of which is welded as at 56 (FIGURES 6 and 7) to the rear or inside of front rail 30. An extension 58 of the raceway 42 extends across the side frame member 38 and is secured to the outer edge thereof as by welding. The horizontal base section 60 of the raceway 42 extends at a right angle from the vertical side 55 toward the inside and is provided near its arcuate edge with spaced apart arcuate slots 62 and 64 which extend substantially the entire length of the raceway. Slots 62 and 64 provide the guide and raceways for the track bearings 66 and 68 which are secured to the seat frame and which are preferably of plastic material.

With reference to FIGURES 6 and 7 the bearings 66 and 68 are similar and comprise a lower bearing washer 70 underneath the track base 60 and main bearing washer 72 on top of the base and between it and the underside of the seat frame. A bolt 74 extending through either slot 62 or 64 holds the bearing assembly together. The inside bearing 66 (FIGURE 6) is secured to a small U-bracket 76 welded to the inner side member 78 of the seat frame structure. The outer bearing 68 (FIGURE 7) is secured to a hollow square shaped cross member 80 which extends diagonally across the underside of the seat frame and is secured to the inner side member 78 at one end and to the outer side member 82 at the other end.

The outer edge of extension 58 of raceway 42 provides an arcuate bearing face 84 (FIGURE 5) which has the same center as the arcs of the slots 62, 64 and which constitutes a guiding surface for a rotatable outer bearing 86 secured to the outer side member 82 of the seat frame structure. Bearing 86 is also preferably composed of plastic material and is provided to maintain accurate swivel action and to lessen the side thrust on the track bearings 66 and 68 under load.

The retraction spring 50 extends diagonally across underneath the seat frame and is secured adjacent the end of track 42 to the side seat frame member 78 and to the side member 38 of the base frame 12. Spring 50 aids in swinging the seat section 20 outwardly.

The catch lock 54 is provided on the forward outer edge of the seat section 20 and base frame side member 38 and is shown in detail in FIGURE 10. The lock comprises a bolt 88 extending through the outer side frame member 82 of the seat frame and having inwardly and downwardly extending catch 90 which normally is held in a recess 92 of a bracket 94 welded to the top of the side member 38 of the base frame 12. A retraction spring 96 normally holds the catch 90 in recess 92 of the lock 94. A lever or handle 98 is provided which may be turned to release the lock.

With further reference to FIGURES 8 and 9 which illustrate more clearly the pivot construction of the swivel seat, the seat 20 is rearwardly supported on a pivot bearing 100 made of plastic material which rests on the raised section of the rear rail 34 of the base frame 12 and is rotatably secured thereto by a bolt 102 extending through rear rail 34 and bearing 100 and is secured to a hanger bracket 104 welded to the bottom of the channel type rear seat frame member 106.

In the operation of the seat structure a passenger on either seat 18 or 20, when the seats are in their normal straight ahead position as in FIGURE 1 or 3, turns the release lever 98 at the front of the seat which action lifts the catch 90 out of the recess 92 in member 94 against the force of the spring 96. Immediately as the catch is released the retraction spring 50 foreshortens and swings the seat 20 (or 18) outwardly around pivot 44 (or 46) and through an arc described by the curvature of the slots 62 or 64 in either track 40 or 42, as illustrated in FIGURE 2. The direction of the pulling force of the spring 50 coincides with the arc of the swivel tracks so that no jamming or jarring occurs during actuation, but instead the actuation of the swivel seats is smooth and the "throw" established by the location of the pivots 44 and 46 is sufficient to lift the passenger through the open door space so that his feet may touch the ground adjacent the car body.

In reverse, when entering, the seat 18 or 20 is released to swing outwardly and the seated passenger applies his own body force to swing inwardly, which can be accomplished with ease. The spring 50 is not strong enough to offer appreciable resistance against this movement. At the end of the inward swinging movement the catch 90 snaps into the recess 92 to firmly hold the seats in their normal position with the spring 96 holding the catch against accidental release through vibration during movement of the automobile.

Forward and rearward movement of the entire front seat is accomplished in the usual manner.

The back rests 22, 24, on seats 18 and 20 can be folded in any position of the swivel seats and do not interfere with the operation thereof.

A slightly modified construction to provide for a folding seat back to facilitate entry of the passengers into the rear compartment of the vehicle is shown in FIGURE 11 to which detailed reference will now be made.

This form of the invention is basically the same as that shown in FIGURES 1–10 except that the seat members 18, 20 and 26 and the associated back rests have been replaced by seats 110, 112 and 114. The seats 110 and 112 are provided with back rests 116 and 118 respectively which meet adjacent the centerline of the vehicle and thus occupy the space which accommodated the separate center back rest 28 of the embodiment of FIGURE 1 which is eliminated in the embodiment of FIGURE 11. The back rests 116 and 118 are hinged by means of links 120 and 122 mounted on the rear frame member of the passenger seat frame. The links 120 and 122 are so arranged that the back rests when folded forward are also tilted inwardly to further increase the ease of access to the rear passenger seat.

FIGURES 12 and 13 illustrate a second and presently preferred embodiment of the base frame structure indicated generally at 12 in FIGURES 1–10. In this form of the invention the side frame members 126 and 128 are shortened and the rear rail 130 is bent upwardly and rearwardly from its point of attachment to the end frame members 126 and 128. Arcuate raceways 132 and 134 which are generally similar to the raceways 40 and 42 extend across the front rail 136 and are welded to the front side of this rail instead of to the rear or inner side of the front rail as in the previously described embodiment. This construction provides for a longer arc and a more stable front end support for the seats. The pivot members 138 and 140 are welded to the elevated portion of the rear rail 130 to position their pivot openings 142 and 144 at the center of the arcs defined by the raceway slots 143 and 145, 146 and 148 in the track members 132 and 134. The lock members 94 are suitably welded to the rails 126 and 128.

The shortened side frame member construction of this form of the invention provides for a substantially improved appearance of the trimmed seat, particularly at the rear corners and also substantially increases the effective size of the passageway into or out of the rear compartment between the door posts and the seat frame. The entire assembly is of unitary welded construction to provide an essentially integral base frame-raceway unit which may be fabricated at relatively reduced cost and may be easily shipped and stored.

The present invention may be embodied in other specific forms without departing from the spirit and essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A seat construction for a vehicle comprising a rectangular frame formed by front, rear and end rails, means mounting said frame in said vehicle for bodily adjustment forwardly and rearwardly, a seat cushion assembly, a pivot mount for said cushion assembly carried by said rear rail and positioned laterally inwardly of the adjacent end rail and adjacent the rear edge of said cushion assembly, a substantially horizontal plate-like raceway bridging the front corner of said frame and rigidly secured to the front rail and to the adjacent end rail, said raceway having a substantially horizontal support surface concentric with said pivot mount and a curved guide surface also concentric with said pivot mount, at least two slide assemblies carried by said cushion assembly, said slide assemblies each including slide members engageable with said support surface of said raceway and a guide assembly carried by said seat cushion assembly for engagement with said guide surface.

2. The combination according to claim 1 wherein said raceways are provided with arcuate slots concentric with said pivot mount and wherein said slide assemblies comprise a part extending through said slots and said slide members are carried on said part above and below said raceway.

3. The combination according to claim 2 wherein said guide assembly comprises a roller mounted on said cushion assembly for rotation about a substantially vertical axis.

4. In a vehicle passenger seat construction, a base frame adapted to be mounted on a vehicle floor, said base frame having transversely extending front and rear members and opposite side members all rigidly secured together, laterally spaced seat sections on said base frame, fixed vertical axis means pivoting the rear ends of said seat sections directly to said rear base frame member, guide slot raceways rigidly mounted on said front base frame member at the front ends of said seat sections, said guide slots being arcuate and substantially concentric with the associated seat section pivot axes, and at least two guide members depending from each seat section to slidably interfit with the associated guide slots, each said guide slot raceway and associated guide members having superposed surfaces in sliding bearing engagement therebetween in a substantially horizontal plane, whereby said seat sections may be swung oppositely from a normal position on the frame to an outwardly facing passenger dismount position.

5. In the vehicle seat construction defined in claim 4, said pivot axes for the seat sections each being offset laterally inwardly of a centerline through the seat section extending longitudinally of the vehicle.

6. In a seat construction for a vehicle having a body frame mounted on the vehicle floor and extending between opposite side door openings, seat cushion assemblies on said frame, means mounting said seat cushion assemblies for opposite swinging movement for moving said seat cushion assemblies from normal straight ahead positions to positions where their forward ends are faced outwardly at said door openings, said means comprising a vertical pivot mount between each seat cushion assembly and the rear end of said frame, supporting raceways rigid with the front end of said frame, said raceways having horizontal slide surfaces and arcuate guide surfaces centered on the axes of said vertical pivots, and depending guide members on said cushion assemblies slidably engaging both said guide surfaces and horizontal slide surfaces on said raceways, means latching each seat cushion assembly in said normal position, and spring means swinging each said seat cushion assembly outwardly when its latch means is released.

7. In a vehicle passenger seat construction, a rigid unitary seat cushion mounting and adjustment supporting frame comprising front, rear and opposite side members permanently welded together, cushion pivot mounting members rigid with the rear frame member and disposed laterally inwardly of the ends of the associated frame side members, and cushion guide raceways secured by welding upon the front corners of said frame, said raceways containing guide surfaces concentric with the axes of the respective pivot mounts.

References Cited in the file of this patent

UNITED STATES PATENTS

| | | |
|---|---|---|
| 1,903,267 | Roberts | Mar. 28, 1933 |
| 2,246,076 | Riley | June 17, 1941 |
| 2,376,095 | Shoeld | May 15, 1945 |
| 2,576,004 | Fair | Nov. 20, 1951 |
| 2,633,581 | St. Martin | Apr. 7, 1953 |
| 2,740,463 | Young | Apr. 3, 1956 |
| 2,822,858 | Mussler | Feb. 11, 1958 |
| 2,851,083 | Rhodes | Sept. 9, 1958 |
| 2,886,095 | Heyl | May 12, 1959 |
| 2,893,473 | Pitts et al. | July 7, 1959 |
| 2,958,369 | Pitts et al. | Nov. 1, 1960 |

FOREIGN PATENTS

| | | |
|---|---|---|
| 513,916 | Italy | Feb. 8, 1955 |